(No Model.)

J. L. & Z. R. GREEN.
LEMONADE SHAKER.

No. 602,939. Patented Apr. 26, 1898.

Witnesses: Inventors:
F. G. Fischer, J. L. and Z. R. Green.
By Higdon & Higdon,
Attys.

UNITED STATES PATENT OFFICE.

JAMES L. GREEN AND ZACK R. GREEN, OF KANSAS CITY, MISSOURI.

LEMONADE-SHAKER.

SPECIFICATION forming part of Letters Patent No. 602,939, dated April 26, 1898.

Application filed June 29, 1897. Serial No. 642,869. (No model.)

*To all whom it may concern:*

Be it known that we, JAMES L. GREEN and ZACK R. GREEN, of Kansas City, Jackson county, Missouri, have invented certain new and useful Improvements in Lemonade-Making Appliances, of which the following is a full, clear, and exact description, reference being had to the accompanying drawings, forming a part thereof.

Our invention relates to lemonade-making appliances; and our object is to produce appliances of this character which are simple, durable, and inexpensive of manufacture and by which a glass of lemonade may be made in an exceedingly short space of time.

In order that the invention may be fully understood, we will proceed to describe it with reference to the accompanying drawings, in which—

Figure 1:
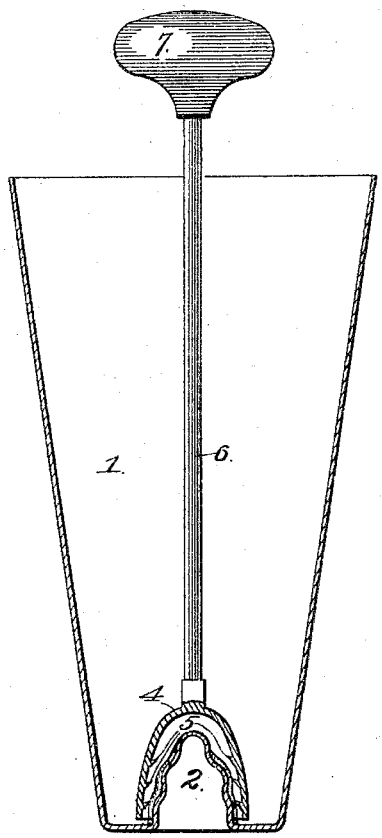
Figure 2:
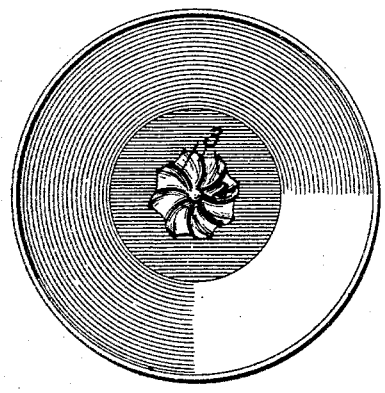
Figure 3:
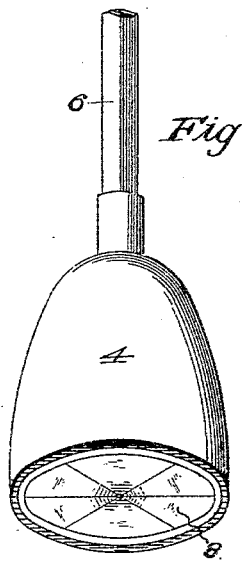

Figure 1 represents a vertical section of our improved lemonade-making appliance, the same comprising a shaker and a lemonade-holder which conjointly act as lemon-juice extractors. Fig. 2 represents a top plan view of the shaker. Fig. 3 represents a perspective view of the holder.

In the said drawings, 1 designates a shaker which is of the requisite capacity and of customary form. It is preferably formed of aluminium or equivalent material and is provided at its base with the mound or cone 2, the same occupying the interior portion of the shaker and being provided with comparatively sharp ribs or flanges 3 exteriorly, or its exterior surface may be roughened in any other suitable manner, provided that such surface will reliably scrape the interior of the lemon and extract therefrom its juice and pulp, as will be presently explained. In order to properly position the lemon upon such scraping mound or cone and to remove the skin of the lemon without necessitating the insertion of a spoon or fork or equivalent into the shaker, we provide a holder constructed as follows:

4 designates a hollow cap or receptacle of approximately conical form provided internally with a plurality of upwardly and inwardly projecting teeth or projections 5, or the interior surface of said conical cap or holder may be roughened in any other suitable manner, provided it shall be susceptible of properly grasping and reliably holding the lemon from independent rotatable movement and will not release the lemon and permit it to escape as the holder is lifted from the shaker, as presently referred to. This cap or holder at its apex is provided with any suitable stem, as at 6, terminating in or provided at its upper end with a head or handle, as at 7.

In practice, to extract the juice and pulp of a lemon quickly and easily it is first cut in half and one of the halves inserted in said hollow cap or holder, being pressed therein sufficiently tight that the said teeth or roughened surface prevents it from falling out. It is then lowered until the cut end of the lemon contacts with the crown of the mound or cone. It is pressed firmly thereon, and twisted back and forth by the operator, and as the juice and pulp are thus extracted they descend or work toward the bottom of the shaker, and as the pulp is loosened the holder of course by continued pressure descends also until at last the juice and pulp of the lemon are entirely extracted, leaving only the skin secured firmly in the cap or holder, owing to the fact that the teeth of the latter are embedded firmly in the same. This entire operation can be performed with a few twists of the wrist, and when the operator lifts the holder out of the shaker he removes the skin and the holder is ready to receive another half-lemon.

It will thus be seen that we have produced appliances for making lemonade which can be manipulated very easily and quickly, which will positively and reliably extract all of the juice and pulp of the lemon, and which can be easily cleaned when desirable or necessary.

It is to be understood, of course, that the precise method of roughening the interior of the hollow cap or holder is immaterial, and the same is true regarding the external or operative surface of the mound or cone 2, rising from the bottom and within the shaker.

Having thus described the invention, what we claim as new, and desire to secure by Letters Patent, is—

The combination with a lemonade-shaker provided with a roughened cone or mound rising from the base, of a hollow cap or cone provided internally with pointed teeth 5 to be embedded in the skin of a lemon, and with a handle, substantially as shown and described.

In testimony whereof we affix our signatures in the presence of two witnesses.

JAMES L. GREEN.
ZACK R. GREEN.

Witnesses:
  M. R. REMLEY,
  E. TINKER.